US012809633B2

(12) United States Patent
Rahman et al.

(10) Patent No.: US 12,809,633 B2
(45) **Date of Patent: *Nov. 24, 2026**

(54) VECTOR TRANSFORMATION IN PARALLEL WITH ARITHMETIC OPERATION

(71) Applicant: Texas Instruments Incorporated, Dallas, TX (US)

(72) Inventors: Mujibur Rahman, Plano, TX (US); Timothy David Anderson, University Park, TX (US); Joseph Zbiciak, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 19/005,909

(22) Filed: Dec. 30, 2024

(65) Prior Publication Data

US 2025/0130808 A1 Apr. 24, 2025

Related U.S. Application Data

(63) Continuation of application No. 18/370,487, filed on Sep. 20, 2023, now Pat. No. 12,182,573, which is a (Continued)

(51) Int. Cl.
*G06F 9/38* (2018.01)
*G06F 9/30* (2018.01)

(52) U.S. Cl.
CPC .......... *G06F 9/3802* (2013.01); *G06F 9/3001* (2013.01); *G06F 9/30036* (2013.01);

(Continued)

(58) Field of Classification Search
CPC ............... G06F 9/3001; G06F 9/30036; G06F 9/30079; G06F 9/30145
See application file for complete search history.

(56) References Cited

U.S. PATENT DOCUMENTS

| | | |
|---|---|---|
| 7,627,741 B2 | 12/2009 | Bhullar |
| 8,595,280 B2 | 11/2013 | Symes |

(Continued)

FOREIGN PATENT DOCUMENTS

| | | |
|---|---|---|
| CN | 1997962 A | 7/2007 |
| CN | 102197369 A | 9/2011 |

(Continued)

OTHER PUBLICATIONS

Office Action for Chinese Patent Application 202080036614.9, dated Jun. 25, 2025, 19 pages.

(Continued)

*Primary Examiner* — Zachary K Huson
(74) *Attorney, Agent, or Firm* — Carl G. Peterson; Charles F. Koch

(57) ABSTRACT

An integrated circuit, comprising an instruction pipeline that includes instruction fetch phase circuitry, instruction decode phase circuitry, and instruction execution circuitry. The instruction execution circuitry includes transformation circuitry for receiving an interleaved dual vector operand as an input and for outputting a first natural order vector including a first set of data values from the interleaved dual vector operand and a second natural order vector including a second set of data values from the interleaved dual vector operand.

20 Claims, 6 Drawing Sheets

Related U.S. Application Data continuation of application No. 17/737,405, filed on May 5, 2022, now Pat. No. 11,768,685, which is a continuation of application No. 16/881,327, filed on May 22, 2020, now Pat. No. 11,327,761.

(60) Provisional application No. 62/852,619, filed on May 24, 2019.

(52) U.S. Cl.
CPC ...... *G06F 9/30079* (2013.01); *G06F 9/30145* (2013.01); *G06F 9/3836* (2013.01); *G06F 9/3887* (2013.01)

(56) References Cited

U.S. PATENT DOCUMENTS

| | | | | |
|---|---|---|---|---|
| 10,409,592 | B2 | 9/2019 | Burgess | |
| 11,237,905 | B2 | 2/2022 | Chachad et al. | |
| 11,327,761 | B2 | 5/2022 | Rahman et al. | |
| 11,768,685 | B2 | 9/2023 | Rahman et al. | |
| 12,182,573 | B2 * | 12/2024 | Rahman | G06F 9/30032 |
| 2010/0106940 | A1 | 4/2010 | Muff | |
| 2012/0072700 | A1 | 3/2012 | Abernathy | |
| 2012/0260061 | A1 | 10/2012 | Reid | |
| 2014/0006469 | A1 | 1/2014 | Gueron | |
| 2014/0372727 | A1 | 12/2014 | Valentine et al. | |
| 2016/0070536 | A1 | 3/2016 | Maeda | |
| 2017/0153890 | A1 | 6/2017 | Anderson et al. | |
| 2017/0192780 | A1 | 7/2017 | Valentine | |
| 2019/0042242 | A1 | 2/2019 | Das | |
| 2019/0079903 | A1 | 3/2019 | Dreyer et al. | |
| 2019/0146790 | A1 | 5/2019 | Anderson et al. | |
| 2019/0310854 | A1 | 10/2019 | Bainville et al. | |
| 2020/0371918 | A1 | 11/2020 | Chachad et al. | |

FOREIGN PATENT DOCUMENTS

| | | | |
|---|---|---|---|
| CN | 104115115 | A | 10/2014 |
| CN | 102053817 | B | 9/2015 |
| CN | 105302522 | A | 2/2016 |
| CN | 106605206 | A | 4/2017 |
| CN | 106796502 | A | 5/2017 |
| CN | 106796503 | A | 5/2017 |
| CN | 108268244 | A | 7/2018 |
| CN | 108292223 | A | 7/2018 |
| CN | 108415882 | A | 8/2018 |
| CN | 108780394 | A | 11/2018 |
| CN | 108885550 | A | 11/2018 |
| CN | 109582357 | A | 4/2019 |
| CN | 109791488 | A | 5/2019 |
| CN | 108733345 | B | 3/2024 |
| JP | 2503678 | B2 | 6/1996 |

OTHER PUBLICATIONS

Chinese Notice of Allowance and Supplemental Search Report for Corresponding Application No. 202080036614.9, mailed Nov. 25, 2025, 5 pgs.

Wang Deli et al. "Analysis and design of X86 instruction compatible 32bit multiplier," Application Research of Computers, vol. 25, No. 4, Apr. 2008, 4 pgs.

Zhu Pengcheng et al. "Design and simulation of pipelining for reversible processor," Computer Engineering and Design, vol. 37, No. 10, Oct. 2016, 7 pgs.

International Search Report for PCT/US2020/034554 mailed Sep. 10, 2020.

* cited by examiner

VECTOR TRANSFORMATION IN PARALLEL WITH ARITHMETIC OPERATION

CROSS-REFERENCE TO RELATED APPLICATIONS

This application is a continuation of U.S. application Ser. No. 18/370,487, filed Sep. 20, 2023, and scheduled to grant as U.S. Pat. No. 12,182,573 on Dec. 31, 2024, which is a continuation of U.S. application Ser. No. 17/737,405, filed May 5, 2022 (now U.S. Pat. No. 11,768,685), which is a continuation of U.S. application Ser. No. 16/881,327, filed May 22, 2020 (now U.S. Pat. No. 11,327,761), which claims the benefit of and priority to U.S. Provisional Application No. 62/852,619, filed May 24, 2019, all of which are hereby fully incorporated herein by reference.

BACKGROUND

The example embodiments relate to a processing device, such as a microprocessor or a digital signal processor, that can be formed as part of an integrated circuit, including on a system on a chip (SoC). More specifically, embodiments relate to a processing device with vector data processing, for example, a single instruction, multiple data (SIMD) processor.

SIMD processing typically involves a number of functional units that concurrently operate on respective parts of vector data as part of the execution cycle. In response to a single SIMD instruction, each functional unit receives a respective operand as a portion of either one or two input vectors, depending on the desired execution operation, and upon execution the functional unit outputs its result as a portion of an output vector. The functional units are commonly replicated hardware, such as arithmetic logic unit (ALU) hardware. For example, an SIMD processor may include eight ALU functional units, each operable on a 64-bit operand. Collectively all eight ALU units concurrently input a total of 512 bits (8 units*64 bits=512 bits) from an input vector (or twice that in a two-operand instruction), followed by an ALU operation and output of 512 bits to an output vector. In some processors, the input/output data path of each functional unit is referred to as a lane. The lane is a logical construct, sometimes also imposed by hardware configuration, and it defines each ALU functional unit data path so that inputs and outputs are constrained to stay in a same lane. For the previous example, therefore, if the addition is of 512-bit data vector VB0 to a 512-bit data vector VB1, then each data vector is evenly-divided among eight lanes, with each lane having 64 bits. Further, bits are input and output in the same respective lane of each data vector, so for example, the least significant lane of VB0 (referred to as VB0[L0]) is added to the least significant lane of VB1 (referred to as VB1[L0]), and the result is output to a respective lane in an output data vector VB2, with that lane referred to as VB2[L0]. In this same example, therefore, each respective more significant lane of each data vector also is concurrently added and output for all 8 lanes of 64 bits each, whereby VB2[L1]=VB0[L1]+VB1[L1], VB2[L2]=VB0[L2]+VB1[L2], and so forth up to VB2[L7]=VB0[L7]+VB1[L7]. The output data vector VB2 thereby retains the alignment of the input vectors, providing what is sometimes referred to as a natural order vector.

The preceding implementation of SIMD processor operations may provide considerable benefits, such as computational speed, memory bandwidth, and processor scheduling, particularly for certain types of data processing where a same operation is needed across multiple independent data values that can be accumulated into a vector. Examples of such data may be sensor, video, voice, radar, biomedical, and others. However, some mathematical operations might require that operands or arithmetic outputs be re-arranged beyond respective lanes, thereby providing a vector that is not a natural order vector. For example, co-owned U.S. application Ser. No. 16,551,587, published on Dec. 12, 2019, as U.S. 2019/0377690, is fully incorporated herein by reference and describes various methods and apparatus for vector permutation, in connection with such considerations. Those methods and apparatus provide numerous benefits, but also may require considerable complexity.

Accordingly, example embodiments are provided in this document that may improve on certain of the above concepts, as further detailed below.

SUMMARY

One embodiment includes an integrated circuit, comprising an instruction pipeline that includes instruction fetch phase circuitry, instruction decode phase circuitry, and instruction execution circuitry. The instruction execution circuitry includes transformation circuitry for receiving an interleaved dual vector operand as an input and for outputting a first natural order vector including a first set of data values from the interleaved dual vector operand and a second natural order vector including a second set of data values from the interleaved dual vector operand. Other aspects are also disclosed and claimed.

DETAILED DESCRIPTION

Figure 1:
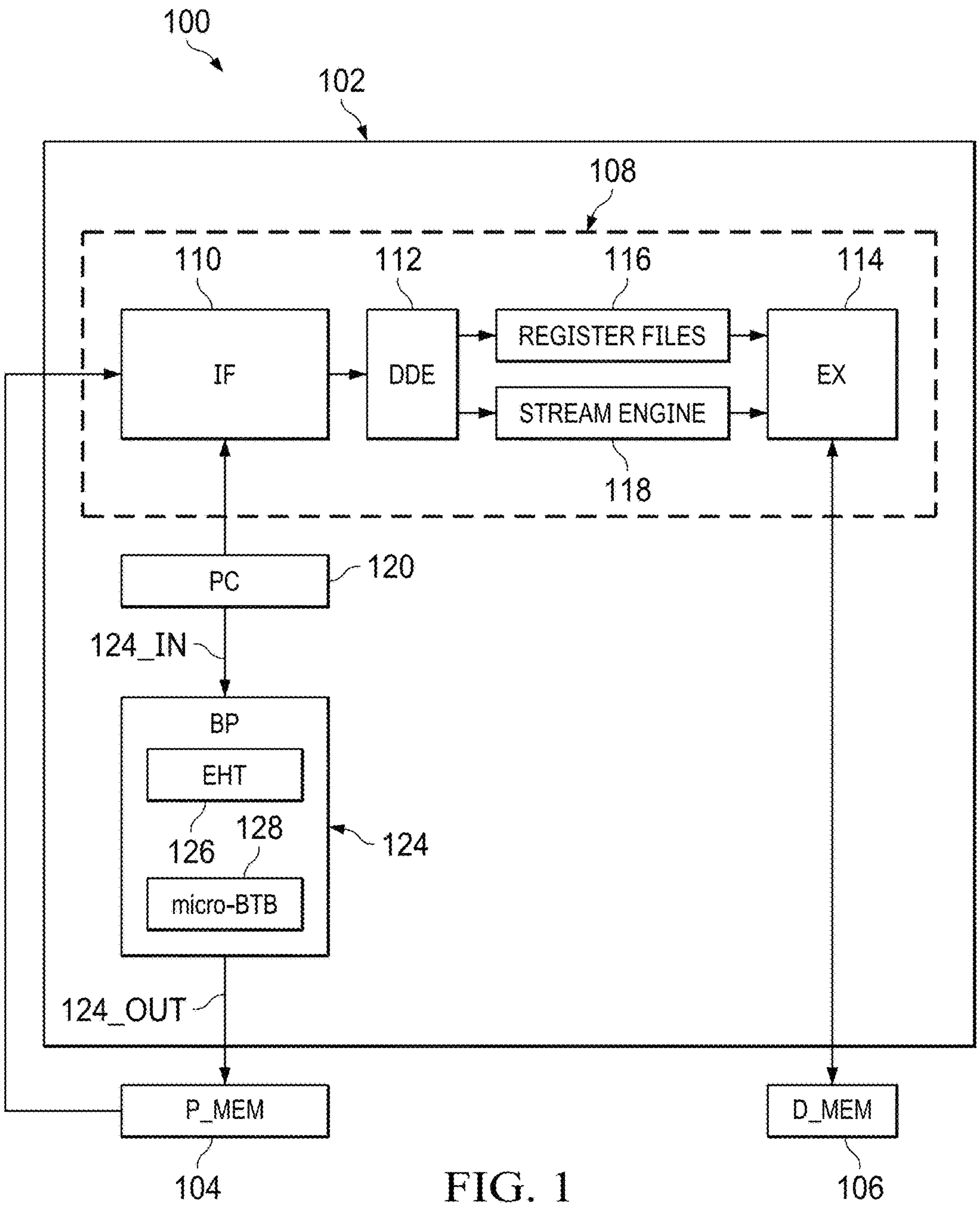
FIG. 1 illustrates a block diagram of a processing device.

FIG. 1 illustrates a block diagram of a processing device 100, such as a microprocessor or a digital signal processor that can be formed as part of an integrated circuit, including on an SoC. For example, processing device 100 may be implemented in connection with, or as modifications to, various processors commercially available from Texas Instruments Incorporated, including its TMS3207x processors. Processing device 100 is illustrated in a simplified form, so as to provide to an understanding of example embodiments. Additional details of processors, as may be included in processing device 100, also may be found in the above-incorporated U.S. application Ser. No. 16,551,587 (U.S. 2019/0377690).

Processing device 100 includes a central processing unit (CPU) core 102, which may represent one or more CPU cores. CPU core 102 is coupled to a program memory (P_MEM) block 104 and a data memory (D_MEM) block 106. Each of P_MEM block 104 and D_MEM block 106 may, and most likely, represents a hierarchical memory, including one or more controllers accessing one or more levels of memory (e.g., via cache), where such memory can include both internal and external memory. Generally, P_MEM block 104 provides program instructions to CPU core 102, and D_MEM block 106 may be read by, or written to, by CPU core 102. Additionally and by way of example, certain aspects of such memories may be found in co-owned U.S. patents application Ser. Nos. 16/874,435 and 16/874,516, filed May 14, 2020, and fully incorporated herein by reference.

CPU core 102 includes a number of phases that collectively provide an instruction pipeline 108 that operates in response to a clock oscillator (e.g., a crystal oscillator, either internal or external and not separately shown). For sake of example, and with a potential reduction in total phases for simplification, FIG. 1 illustrates pipeline 108 to include three phases, each of which may include a number of stages (not separately shown). Those three phases are an instruction fetch (IF) phase 110, an instruction dispatch and decode (DDE) phase 112, and an execution (EX) phase 114. Additionally, DDE phase 112 cooperates with two potential data sources, namely, register files 116 and a stream engine 118. Each pipeline phase represents a successive action, or actions, taken with respect to a program instruction.

Generally, IF phase 110 includes connectivity and hardware (e.g., register(s)) to fetch an instruction from P_MEM block 104 into storage, from where the instruction may be subsequently decoded and dispatched. The address of the fetched instruction is indicated, or determined in response to, a program counter (PC) 120. IF phase 110 may include three stages, including program address generation, program memory access, and a program instruction receipt. Note also that as used herein, an "instruction" may include a number of bits which, in its entirety, includes a number of instructions. For example, the fetch may be of a 512-bit instruction packet that can represent a single executable instruction, or that may be subdivided into separate instructions, for example, up to 16 separate instructions, each formed by 32 bits. Such an example may be implemented, for instance, where processing device 100 is implemented as a SIMD processor which includes parallel execution units, each operable to concurrently execute a respective instruction fetched as part of larger instruction packet.

Next, the fetched instruction is dispatched and decoded by DDE phase 112. DDE phase 112 may include three stages, including a dispatch stage that buffers the instruction packet and potentially splits the packet based on whether it includes multiple instructions, followed by a first and second instruction decode stage to decode the instruction packet (which at that point may be split from the dispatch into separate instructions). Also in completing DDE phase 112, data operations for the decoded instruction may be sourced from either register files 116 or stream engine 118, where stream engine 118 is a separate mechanism that can stream data in certain circumstances, for example in connection with certain instruction loops. The sourced data may be in either scalar or data vector form, where the data vector form is notable in connection with improvements described in this document. As a reference example, unless otherwise stated assume that a single data vector provides eight total operands, with each operand having 64 bits (512 bits total per data vector). Also for reference, a byte is defined as 8 bits, a word as 32 bits, and a double word ("Dword") as 64 bits; accordingly, one example data vector provides eight Dwords. The nature of a data vector, however, is that its bits are not necessarily, and indeed not likely to represent, an entire 512-bit contiguous value in the sense of providing a quantitative measure or indication of a single value, but rather, within the 512 bits are equal bit-sized portions, each representing a different and separable data value, so that each value can be partitioned for operations apart from other values in that same data vector. For instance, the earlier Background described a SIMD lane of 64 bits (two words, or alternatively stated, one Dword), so a 512-bit data vector can be considered to have eight lanes, each one Dword wide. Also, in some instances, within a lane, smaller bit-sized quantity operations may occur, for example with respect to 16-bit quantities referred to herein as elements. By the earlier convention, therefore, the processor's least significant lane (64 bit) of a data vector VB0 is that vector's 64 least significant bits indicated as VB0[L0], while the next most significant lane of data vector VB0 is that vector's 64 next most significant bits indicated as VB0[L1], and so forth up to the processor's most significant lane of a data vector VB0, which is that vector's 64 most significant bits indicated as VB0[L7]. Accordingly, a functional unit operation may be performed for a lane VB0[L0] of a first vector VB0, either only on (or within) that operand (e.g., addition of a constant) or relative to a comparably-positioned lane VB1[L0] of a second vector VB1 (e.g., addition of a first vector to a second vector, along the lane). Finally, DDE phase 112 also identifies the functional unit to execute an instruction and a location to where the instruction result is stored.

Following DDE phase 112, the decoded instruction (packet) is committed to and executed by EX phase 114. EX phase 114 occurs in connection with one or more operands, from either register files 116 or stream engine 118, where operands may be scalar or, again of note, such operands may be in the form of one or more data vectors. EX phase 114 may include a number (e.g., five) of execution stages, which also may include memory read and write, so that there is not necessarily a separate writeback phase per se. Further, one or more of the execution stages involves operation by one or more functional units that operate in parallel. Indeed, for data vector instruction execution, a functional unit may include a number of replicated hardware structures, with each structure operable to execute its function on a lane of the data vector. With the example described earlier, then one example of a functional unit is an adder (or a larger arithmetic logic unit that includes addition functionality) having eight lanes or eight separate adders each having a respective lane, where in either case each lane is operable to add a 64-bit portion from a first data vector to a comparably positioned 64-bit portion from a second data vector. As also noted above and further shown below, in some instances an operation on a vector lane may further divide the data across the lane into smaller, equal-sized partitions; for example, across a 64-bit lane, functional unit operations can occur in comparably-positioned 16-bit elements, within the 64-bit lane. For instance, functional unit operation may be performed for the least significant sixteen bits in a lane VB0[L0] of a first vector VB0 relative to a comparably-positioned least significant sixteen bits in a lane VB1[L0] of a second vector VB1, and so forth across all like-positioned 16-bit elements for both the first and second data vectors.

Core CPU 102 also includes a branch predictor (BP) block 124, which may include additional aspects such as an exit history table, a micro-branch target buffer, and a branch target buffer. Collectively, BP block 124 performs branch prediction, which can include one or both of predicting whether a branch instruction is taken (or not taken), and predicting the target address of the branch instruction if the branch instruction is taken. In this regard, BP block 124 receives an input 124_IN that provides the current instruction address indicator value of a program counter (PC) 120 (or some portion of that value), from which BP block 124 provides various options as to predict whether a branch instruction, including one that causes looping, is taken.

Figure 2A:
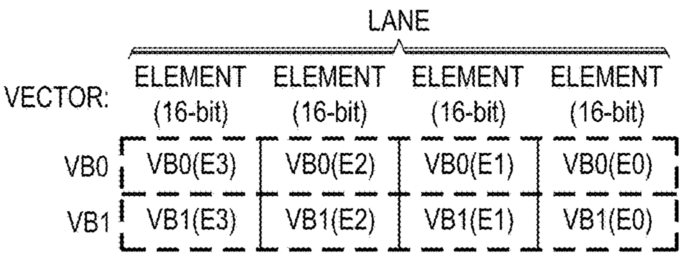
FIG. 2A illustrates the four least significant 16-bit elements of two natural order vectors, VB0 and VB1.

FIG. 2A illustrates the four least significant 16-bit elements of two natural order vectors, VB0 and VB1, to demonstrate an example of a relationship between certain data vectors that may be processed by processing device 100. Accordingly, the collection of four elements per vector is a single Dword, and the respective Dword of each of two vectors VB0 and VB1 is aligned relative to the other in a lane for functional unit execution of like-positioned elements. As a result, a functional unit operation can be achieved with each respective element as an operand, thereby spanning across the entirety of the lane, but with each operation for aligned elements independent of elements in other positions in the lane. For example, a functional unit operation can execute using the least significant elements, VB0(E0) and VB1(E0) as operands. At the same time, and independent of the execution of the E0 positioned elements, the same functional unit can execute using the next more significant elements, VB0(E1) and VB1(E1) as operands, while also independently executing using the next more significant elements, VB0(E2) and VB1(E2) as operands, and lastly while also independently executing using the next more significant elements, VB0(E3) and VB1(E3) as operands. Saturation (reaching a maximum given the binary arithmetic) may or may not occur based on alternative addition instruction types, but in either case, a carry does not propagate from the addition of two elements to the addition of the next most significant pair of elements. Lastly, note that for simplification, FIG. 2A illustrates only a single lane consisting of 64 bits; however, where vectors VB0 and VB1 are 512-bit vectors, then the alignment and convention of FIG. 2A applies to the other bits of each vector, thereby aligning an entirety of eight DWords of each vector across eight respective lanes.

Figure 2B:
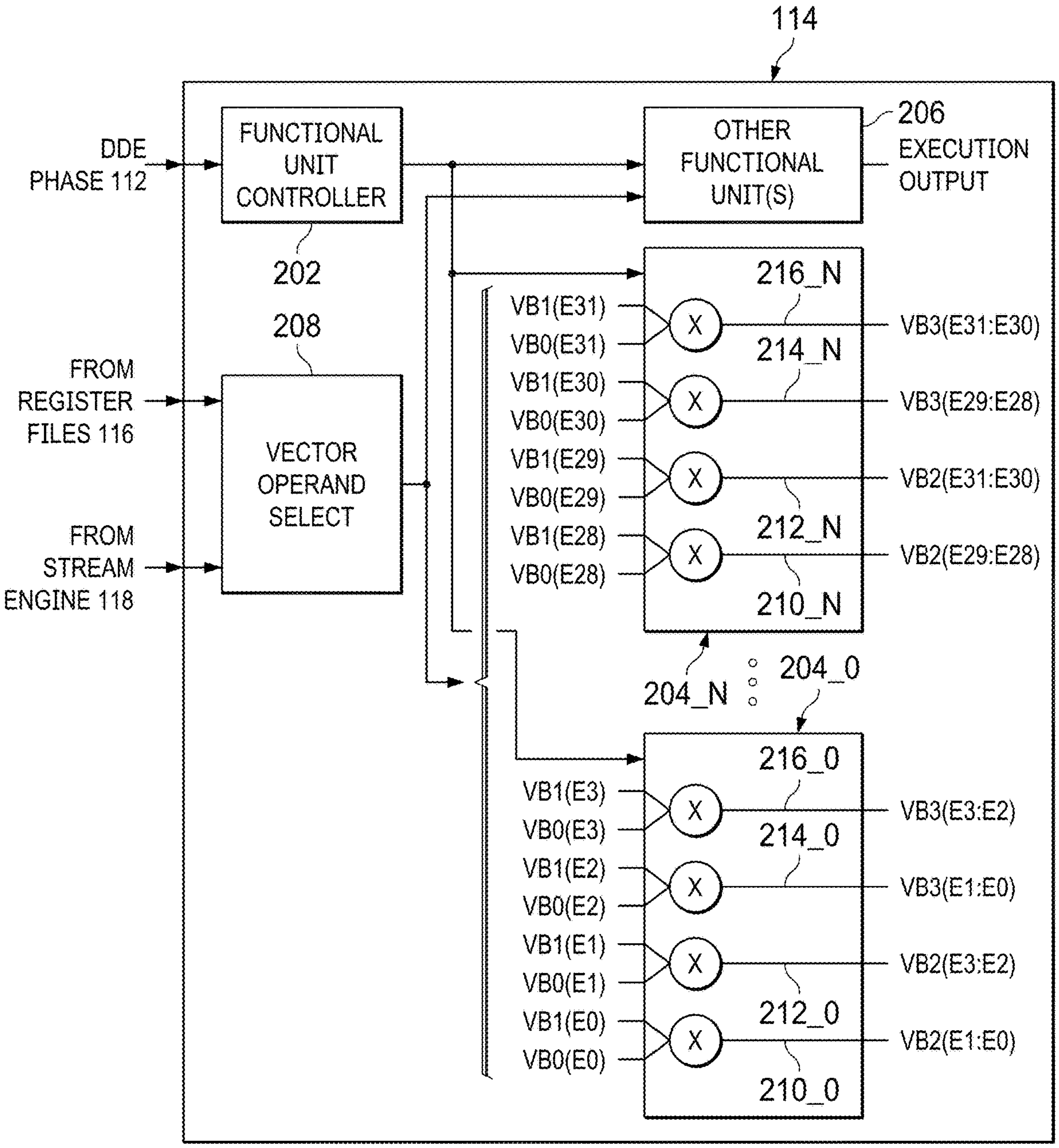
FIG. 2B illustrates a block diagram of selected aspects of the FIG. 1 EX phase 114.

FIG. 2B illustrates a block diagram of selected aspects of EX phase 114 from FIG. 1. EX phase 114 includes a functional unit controller 202 that provides operational control to the functional units of EX phase 114, for example so that a proper functional unit(s) is enabled, to input operands and execute, during an appropriate clock cycle(s) and produce its execution output. In this regard, functional unit controller 202 includes a total of N+1 (e.g., N=7) multiplication functional units, but to simplify the Figure only the least significant multiplication functional unit 204_0 and the most significant multiplication functional until 204_N (e.g., N=7) are shown, while all N+1 units are included in EX phase 114, and each multiplication functional unit is generally operable to output 64 bits along its respective lane. Further, each such multiplication functional unit is controlled, for example, by states in one or more control registers in functional unit controller 202, to perform multiplication when the current program instruction being processed by processing unit 100 is a multiplication instruction (for example as processed in the immediately-preceding phase by DDE phase 112). Functional unit controller 202 also is shown to control other functional unit(s) block 206. Block 206 is simplified so that various details of other functional units that may be included are not shown but are understood as contemplated, including but not limited to those described earlier in connection with FIG. 1 and its EX phase 114; additional one of such functional units, however, are described later in connection with certain vector transformations. EX phase 114 also includes a vector operand select block 208, which can receive data from the FIG. 1 register files 116 and/or stream engine 118 and route such data as operand(s) data to any of other functional unit(s) block 206 or multiplication functional units 204_0 through 204_N. Scalar data also may be used in EX phase 114, but is not shown in FIG. 2B to simplify the illustration.

To maintain precision of an M-bit by M-bit binary multiplication requires a 2*M-bit output. In this regard, since each multiplication functional unit 204_0 through 204_N outputs a 64 bit lane, then for N=7, a total of 512 bits ((N+1)*64=512) can be output at a time across all N+1 functional units. Relatedly, multiplication of VB0 and VB1 is a 512-bit by 512-bit multiplication, thereby requiring a total of 2*512=1,024 output bits, so collectively the functional unit lanes need to output 2*512 bits, which is twice the collective 512-bit lane capacity and twice the capacity of a single 512-bit data vector. To accommodate the doubling of data width for multiplication precision, then multiplication functional unit 204_0 through 204_N collectively produce, as a product of two 512-bit input data vectors (e.g., VB0 and VB1), an output of two different 512-bit data vectors (e.g., vectors VB2 and VB3), by selective routing of multiplication functional unit outputs as further detailed below.

FIG. 2B further illustrates the inputs and outputs (some eliminated to simplify the Figure) to multiplication functional units 204_0 through 204_N (e.g., N=7). Multiplication functional units 204_0 through 204_N are the same in internal structure, but each receives a different first respective set of vector data input operands and outputs, based on the respective multiplication of the unit, a respective set of vector data outputs. As shown and now described, each multiplication functional unit includes four multipliers, a first two of which each multiply two respective 16-bit elements (half-words) from the lesser significant positions of a 64-bit portion of VB0 and VB1 and produce respective 32-bit products into output data vector VB2, and at the same time the second two of which each multiply two respective 16-bit elements from the more significant positions of a 64-bit portion of VB0 and VB1 and produce respective 32-bit products into output data vector VB3.

Figure 2C:
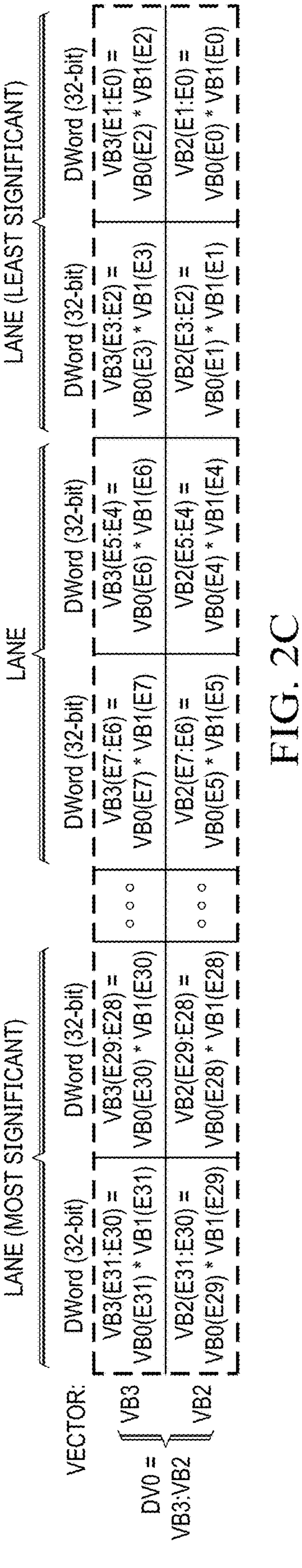
FIG. 2C shows the FIG. 2B products as interleaved into output to vectors VB2 and VB3, forming a dual vector DV0.

Functional block 204_0 of FIG. 2B illustrates an example of the four multipliers introduced above, and FIG. 2C illustrates the selection alignment of operands as elements from VB0 and VB1, with the resulting product outputs in vectors VB2 and VB3, thereby forming a dual vector DV0 (DV0=VB3:VB2). Specifically, functional block 204_0 includes four 16-bit multipliers 210_0, 212_0, 214_0, and 216_0, each receiving operands from vector operand select block 208. Each of the four multipliers input a like-positioned pair of elements, so that multiplier 210_0 inputs the least significant elements, VB0(E0) and VB1(E0), multiplier 212_0 inputs the next more significant elements, VB0(E1) and VB1(E1), multiplier 214_0 inputs the next more significant elements, VB0(E2) and VB1(E2), and multiplier 216_0 inputs the next more significant elements, VB0(E3) and VB1(E3). However, because each multiplier outputs a 32-bit product, then the two lower significant multipliers output to vector VB2, and the two more significant multipliers output to vector VB3. Specifically, multiplier 210_0 outputs the 32-bit product of VB0(E0) and VB1(E0) as the least significant two elements (or one word) of output data vector VB2, shown as VB2(E1:E0), and multiplier 212_0 outputs the 32-bit product of VB0(E1) and VB1(E1) as the next more significant two elements (or one word) of output data vector VB2, shown as VB2(E2:E1). Accordingly, the collective outputs of multipliers 210_0 and 212_0 provide the least significant 64-bit Dword of output data vector VB2. Multipliers 214_0 and 216_0 operate similarly with respect to the next more significant elements from VB0 and VB1, with however to VB3, rather than also to VB2. Specifically, multiplier 214_0 outputs the 32-bit product of VB0(E2) and VB1(E2) as the least significant two elements (or one word) of output data vector VB3, shown as VB3(E1:E0), and multiplier 216_0 outputs the 32-bit product of VB0(E3) and VB1(E3) as the next more significant two elements (or one word) of output data vector VB3, shown as VB3(E2:E1). Accordingly, the collective outputs of multipliers 214_0 and 216_0 provide the least significant 64-bit Dword of output data vector VB3.

The preceding description for multiplication functional unit 204_0 comparably applies, for each increasingly-significant set of four elements from VB0 and VB1, to the remaining multiplication functional units 204_1 through 204_N. Accordingly as another example, multiplication functional unit 204_N includes four multipliers 210_N, 212_N, 214_N, and 216_N. Multiplier 210_N outputs the 32-bit product of VB0(E28) and VB1(E28) as the least significant two elements (or one word) of the most significant Dword of output data vector VB2, shown as VB2(E29:E28), and multiplier 212_N outputs the 32-bit product of VB0(E29) and VB1(E29) as the most significant two elements (or one word) of the most significant Dword of output data vector VB2, shown as VB2(E31:E30). Similarly, but with respect to output vector VB3, multiplier 214_Noutputs the 32-bit product of VB0(E30) and VB1(E31) as the least significant two elements (or one word) of the most significant Dword of output data vector VB3, shown as VB3(E29:E28), and multiplier 216_N outputs the 32-bit product of VB0(E31) and VB1(E31) as the most significant two elements (or one word) of the most significant Dword of output data vector VB3, shown as VB3(E31:E30). The remaining examples of multiplication functional units, not explicitly shown in FIG. 2B, are shown in FIG. 2C and also will be understood to one skilled in the art.

Given the preceding, FIGS. 2B and 2C illustrate that each multiplication functional unit multiplies 16-bit element operands from like positions in VB0 and VB1 to produce 32-bit products output to vectors VB2 and VB3. Further, the multiplication is across four multipliers, such that the outputs of the two less significant multipliers form a Dword output to one output vector (VB2), while the outputs of the two more significant multipliers form a Dword output to another output vector (VB3). From lowest to highest position of significance, therefore, the outputs are such that every other output Dword alternates between output data vectors VB2 and VB3. Note that routing of such outputs may be achieved in various manners. As one example, while multiplication functional units 204_0 through 204_N concurrently operate, another execution unit of the other function unit(s) block 206 may be temporarily locked from receiving a respective instruction, in which case its output bus can be shared with the outputs of multiplication functional units 204_0 through 204_N, so that appropriate data routing can concurrently occur for all 1,024 output bits. In any event, the result interleaves the multiplication product output into each of two 512-bit data vectors. In other words, output data vector VB2 has Dwords that relate to the even-positioned words (word position 0, 2, 4, 6, . . . , 2N) in input data vectors VB0 and VB1, while output data vector VB3 has Dwords that relate to the odd-positioned words (word position 1, 3, 5, 7, . . . , 2N+1) in input data vectors VB0 and VB1. Accordingly, across all multipliers of the N+1 multiplication functional units when N=7, the inputs are two natural order 512-bit input data vectors (e.g., VB0 and VB1), and to maintain precision the output are two 512-bit vectors (e.g., VB2 and VB3), which collectively provide a total of 16 Dword (64-bit) products, for a total of 1,024 product bits. Accordingly, the two output vectors can be characterized as a single dual vector DV0 that consists of the two 512 bit (or 8 DWord) output vectors (e.g., again, VB2 and VB3), in sequence. For convention in this document, therefore, the dual vector DV0 may be represented as VB3:VB2, with that convention suggesting a Dword alignment with VB3 having the more significant position Dwords and VB2 having the less significant position Dwords. And, across the entirety of the dual vector DV0=VB3:VB2, the above-described interleaving is maintained, whereby the products from the least significant two successive input data vector elements of each 64-bit lane are output to successive even numbered Dwords in output vector VB2, while the products from the next most significant two successive input data vector elements of each 64 bit lane are output to successive Dwords in output vector VB3.

Figure 3A:
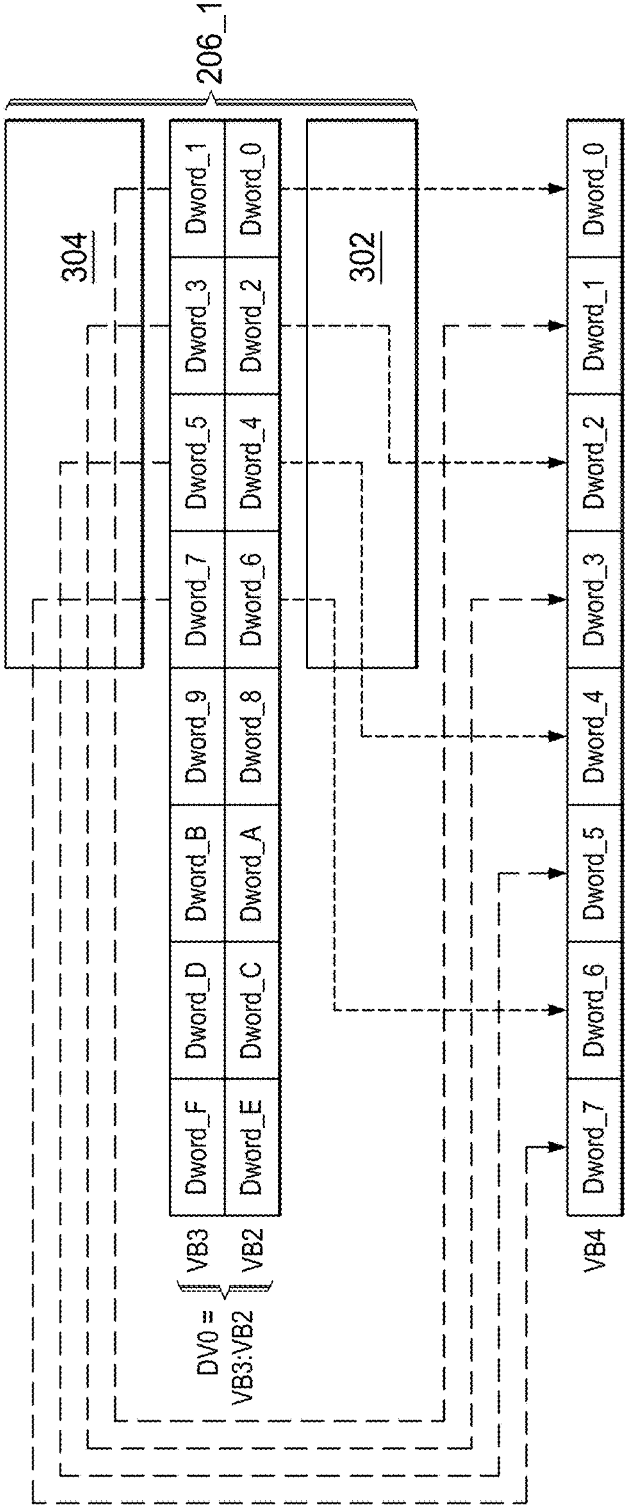
FIG. 3A illustrates an example of an additional one of the FIG. 1 functional unit(s) block 206.
Figure 3B:
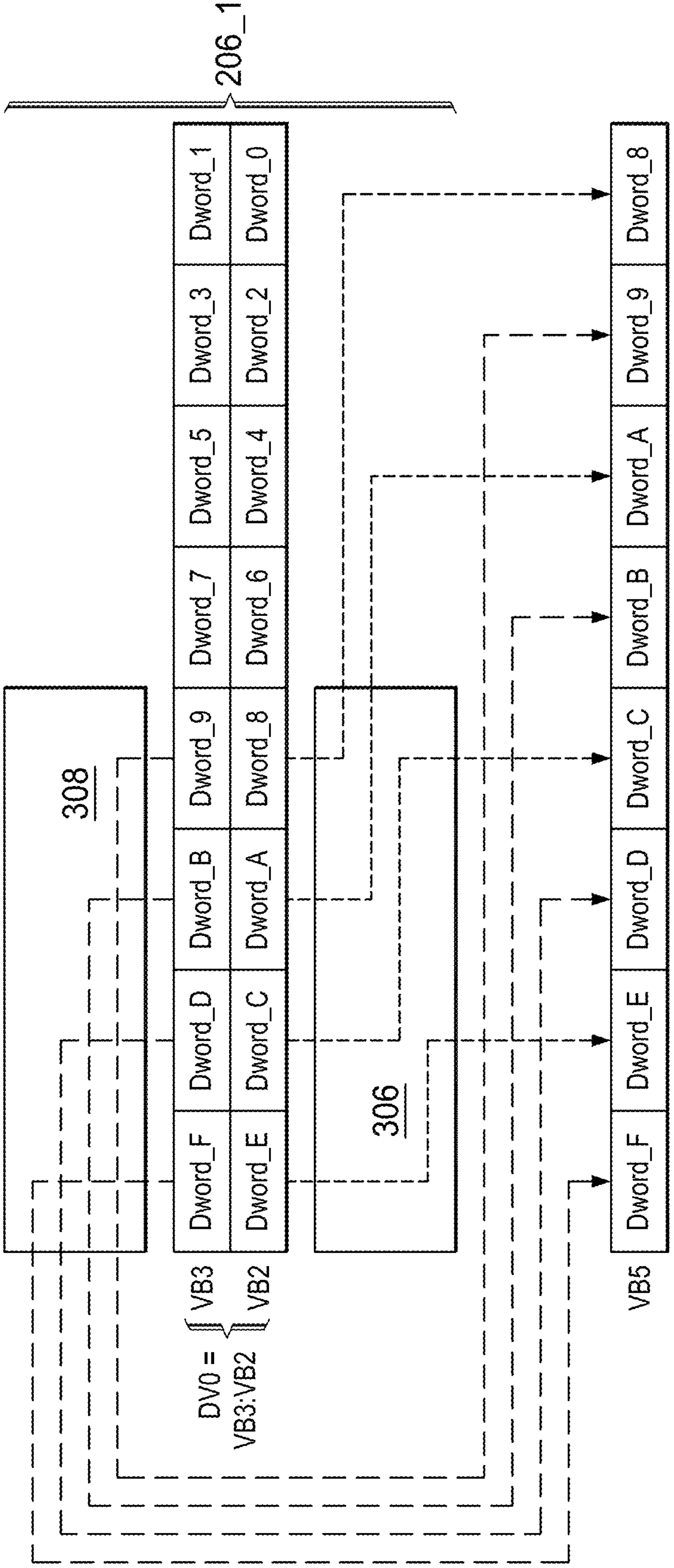
FIG. 3B illustrates two additional blocks of the FIG. 3A PTU 206_1.

FIGS. 3A and 3B illustrate an example of an additional one of functional unit(s) block 206 from FIG. 1 that inputs a dual vector (e.g., DV0=VB3:VB2) and outputs two transformed single vectors by rearranging Dwords from the input to output vectors. FIG. 3A illustrates a first part of the partial transformation from the dual vector to a first output vector (e.g., VB4), and FIG. 3B illustrates a second part of the partial transformation from the dual vector to a second output vector (e.g., VB5). Further, in one example embodiment, the operation of both FIG. 3A and FIG. 3B may occur concurrently, for example by execution in response to a same instruction. In an alternative example embodiment, the operation of FIG. 3A may occur by execution in response to a first instruction, while the operation of FIG. 3B may occur by execution in response to a second instruction, with the instruction indicating a partial transformation of a dual vector to one of two output vectors. In either event, each of FIGS. 3A and 3B is further detailed below.

FIG. 3A illustrates that one of functional unit(s) block 206 from FIG. 1 includes a partial transformation unit (PTU) 206_1. PTU 206_1 includes a lower even half PTU 302 and a lower odd half PTU 304. Each of lower even half PTU 302 and lower odd half PTU 304 generally includes switching or routing circuitry (e.g., multiplexers) for selecting a Dword from a location in a source vector and outputting it to a location in a destination vector. The naming convention of these PTUs, and others described below, refers to the vector data location from where the PTU selects data that is output, as further shown below. Also, PTUs 302 and 304, as functional units, coexist with other EX phase 114 functional units and can independently and concurrently operate in response to an instruction fetched by IF phase 110 and decoded and dispatched by DDE phase. Specifically, in one embodiment, processing device 100 includes in its instruction set a dual vector to paired single vectors (DVTPSV) instruction that, when fetched and decoded, specifies a 1,204 bit (e.g., interleaved) dual vector as an operand and, when executed, produces a pair of single 512-bit data vectors. By way of example, FIG. 3A illustrates the DVTPSV instruction operand as the earlier-described dual vector DV0=VB3:VB2. Also, recall that dual vector DV0 was described as interleaved, and accordingly FIG. 3A illustrates the eight least significant DV0 Dwords (VB2) as providing even-numbered Dwords, such as respective products from earlier-calculated 16-bit by 16-bit multiplication, and also relatedly FIG. 3A illustrates the eight most significant DV0 Dwords (VB3) as providing odd-numbered Dwords, also as respective products. As detailed below, in response to the DVTPSV instruction being executed, PTUs 302 and 304 partially transform elements from the input dual vector into one of two separate natural order vectors (e.g., VB4 and VB5), where FIG. 3A illustrates the first (e.g., VB4) of those two natural order vectors.

The execution operation of each of PTUs 302 and 304 in response to the DVTPSV instruction is now described, and is shown to transform parts of the dual vector input into two separate natural order vectors. Lower even half PTU 302 selects, as shown be a first set of dashed lines that pass through it, the four least significant even-positioned Dwords in the dual vector DV0, which due to interleaving are stored in the lower half, of a first vector (e.g., VB2) in the two vectors that form the dual vector. Further, the four selected DWords are output to the four even-positioned Dword positions in a first natural order vector (e.g., VB4). At the same time, lower odd half PTU 304 selects, as shown by a second set of dashed lines that pass through it, the four least significant odd-positioned Dwords in the dual vector DV0, which due to interleaving are stored in the lower half of a second vector (e.g., VB3) in the two vectors that form the dual vector. Further, the four selected DWords are output to the four odd-positioned Dword positions in the first natural order vector (e.g., VB4). Given the preceding and resultant illustration of FIG. 3A, one half of the dual vector (DV0=VB3:VB2) interleaved elements are restored to a natural order in VB4, as shown by the sequence of Dword_0 at the least significant position in VB4 to Dword_7 at the most significant position in VB4.

FIG. 3B illustrates two additional blocks of first PTU 206_1, namely, an upper even half PTU 306 and an upper odd half PTU 308. Each of upper even half PTU 306 and upper odd half PTU 308 also is generally switching or routing circuitry, coexisting with other EX phase 114 functional units and operating in response to the DVTPSV instruction, shown again in FIG. 3B as dual vector DV0=VB3: VB2. As detailed below, however, in response to the DVTPSV instruction being executed, PTUs 306 and 308 partially transform elements from the input dual vector into a second of two separate natural order vectors (e.g., VB4 and VB5), where FIG. 3B illustrates the second (e.g., VB5) of those two natural order vectors.

The execution operation of each of PTUs 306 and 308 in response to the DVTPSV instruction is now described, and is comparable to PTUs 302 and 304 of FIG. 3A, but operate with respect to the upper half of the two vectors that form the dual vector input operand and output elements to the second natural order output vector VB5. Thus, PTUs 306 and 308 also transform parts of the dual vector input into two separate natural order vectors. Upper even half PTU 304 selects, as shown be a first set of dashed lines that pass through it, each of the four most significant even-positioned Dwords in the dual vector DV0, which due to interleaving are stored in the upper half of the first vector (VB2). Further, the four selected DWords are output to the four even-positioned Dword positions in a second natural order vector (e.g., VB5). At the same time, upper odd half PTU 308 selects, as shown by a second set of dashed lines that pass through it, the four most significant odd-positioned Dwords in the dual vector DV0, which due to interleaving are stored in the upper half of the second vector (VB3) of the two vectors that form the dual vectors. Further, the four selected DWords are output to the four odd-positioned Dword positions in the second natural order vector (e.g., VB5). Given the preceding and resultant illustration of FIG. 3B, the upper half of each vector forming the dual vector interleaved elements are restored to a natural order in VB5, as shown by the sequence of Dword_8 at the least significant position in VB5 to Dword_F at the most significant position in VB5.

Figure 4A:
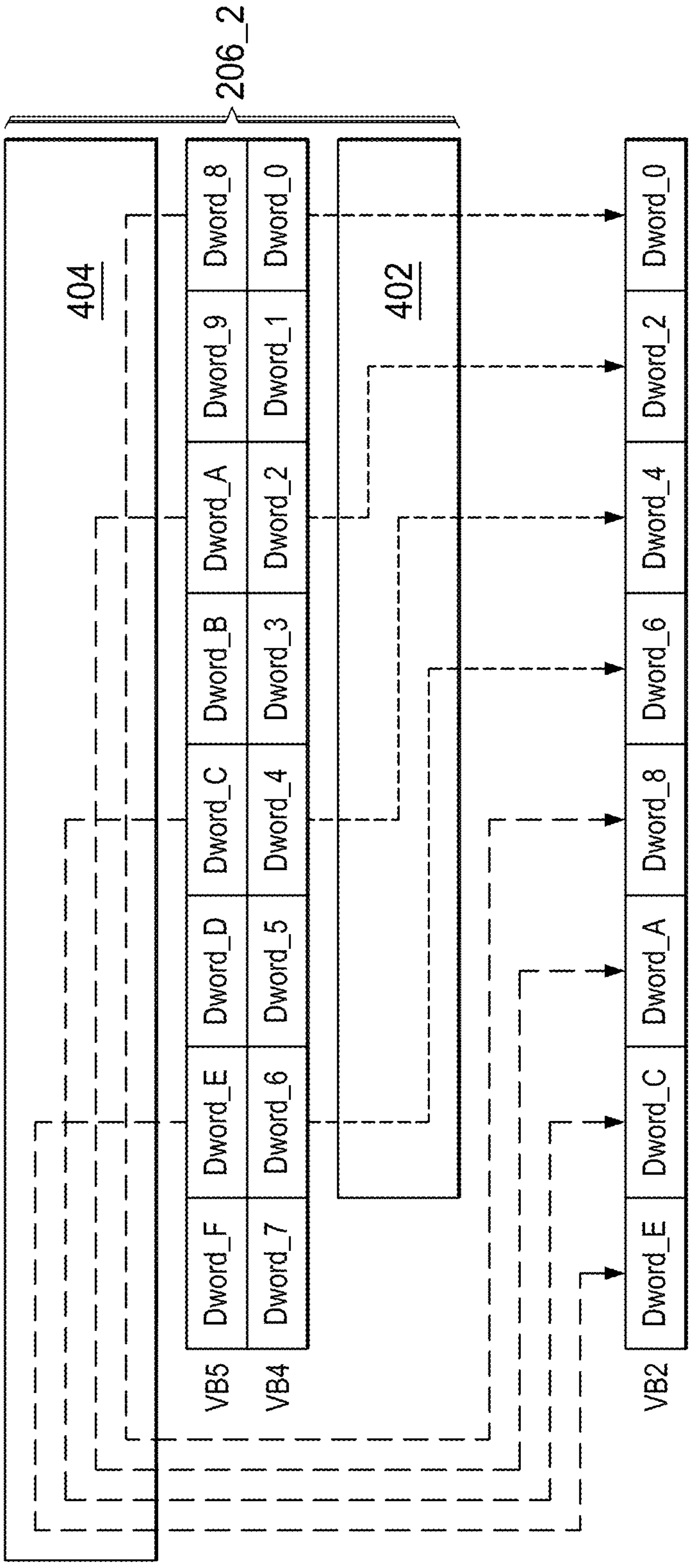
FIG. 4A illustrates an example of another additional one of functional unit(s) block 206 from FIG. 1.
Figure 4B:
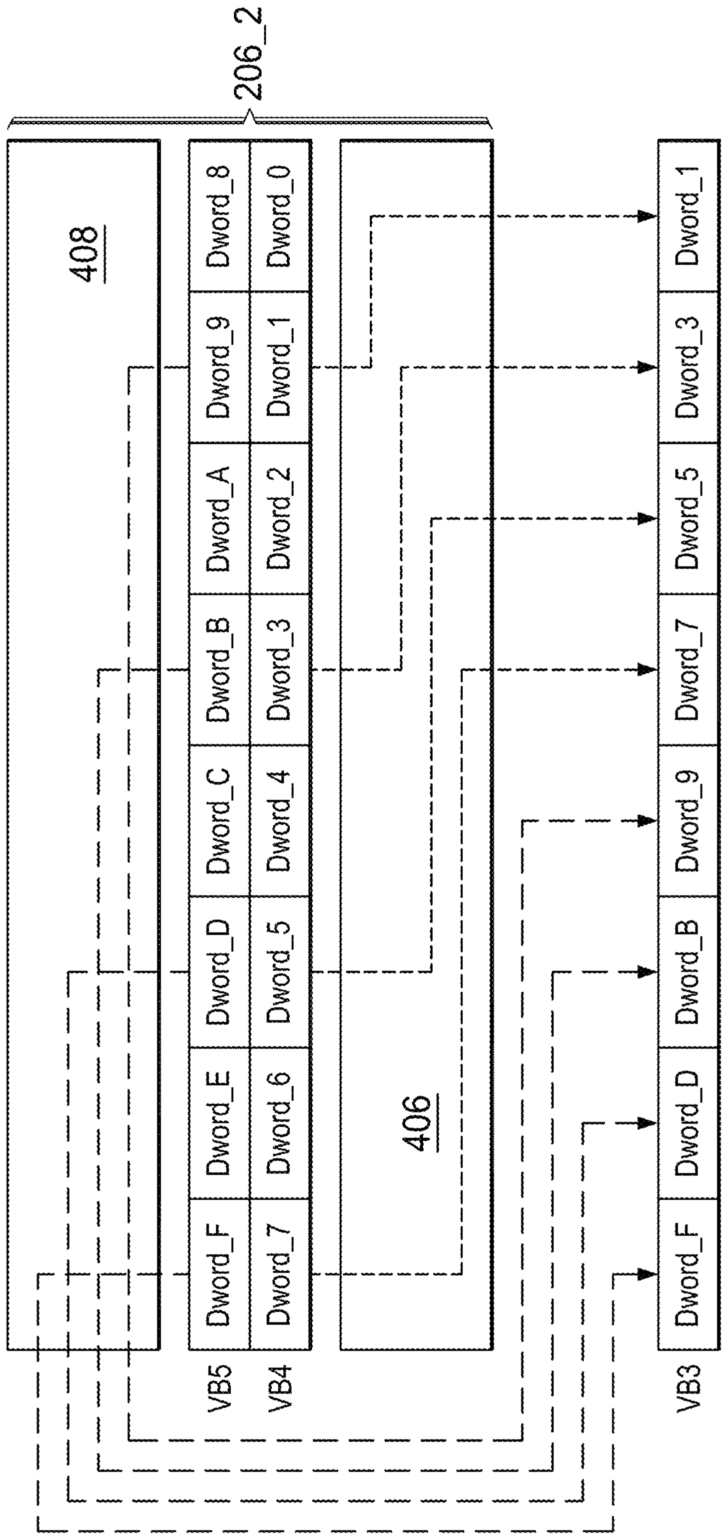
FIG. 4B illustrates two additional blocks of the FIG. 4A PTU 206_2.

FIGS. 4A and 4B illustrates an example of an additional one of functional unit(s) block 206 from FIG. 1, and that together input two different (e.g., natural order) data vectors (e.g., VB4, VB5) and output a transformed interleaved dual vector (e.g., DV0=VB3:VB2) by rearranging Dwords from the input to output vectors. FIG. 4A illustrates a first part of the partial transformation from the two vectors to a first half (VB2) of the dual vector, and FIG. 4B illustrates a second part of the partial transformation from the two vectors to a second half (VB3) of the dual vector. Similar to the above discussion of FIGS. 3A and 3B, alternative embodiments may implement structure for FIGS. 4A and 4B, so that in one embodiment, the operation of both FIGS. 4A and 4B may occur concurrently, for example by execution in response to a same instruction. In an alternative example embodiment, the operation of FIG. 4A may occur by execution in response to a first instruction, while the operation of FIG. 4B may occur by execution in response to a second instruction, with the instruction indicating a partial transformation of portions of two natural order inputs vectors into a corresponding portion of a dual vector output. In either event, each of FIGS. 4A and 4B is further detailed below.

FIG. 4A illustrates that one of functional unit(s) block 206 from FIG. 1 includes a PTU 206_2 that includes a first vector even Dword PTU 402 and a second vector even Dword PTU 404. Each of first vector even Dword PTU 402 and second vector even Dword PTU 404 is also generally switching or routing circuitry, which as functional units coexist with other EX phase 114 functional units and can operate in response to an instruction fetched by IF phase 110 and decoded and dispatched by DDE phase. Specifically, processing device 100 includes in its instruction set a paired single vectors to dual vector (PSVTDV) instruction that, when fetched and decoded, specifies two 512-bit vectors (e.g., natural order vectors) as operands and transforms those vectors to a 1,204 bit (e.g., interleaved) dual vector which is shown as the above-introduced DV0=VB3:VB2, where the least significant 512 bits of that dual vector are shown as VB2 in FIG. 4A and the most significant 512 bits of that dual vector are shown as VB3 in FIG. 4B. As detailed below, in response to the PSVTDV instruction being executed, PTUs 402 and 404 partially transform elements from the two input vectors into interleaved order for each of the two vectors that together form the dual vector DV0. Accordingly, if the input vectors (e.g., VB4 and VB5) are natural order vectors, then the resulting dual vector output is interleaved, as described earlier.

The execution operation of each of PTUs 402 and 404 in response to the PSVTDV instruction is now described, and is shown to transform parts of the two input vectors into a first vector in a dual vector output. First vector even Dword PTU 402 selects, as shown by a first set of dashed lines that pass through it, every even-positioned Dword of a first vector (e.g., VB4), indicated as Dword_0, Dword_2, Dword_4, and Dword_6. Further, first vector even Dword PTU 402 outputs its selected even-positioned Dwords to the four least significant Dwords in the less significant vector (e.g., VB2) of the output dual vector (e.g., DV0). At the same time, second vector even Dword PTU 404 selects, as shown by a second set of dashed lines that pass through it, every even-positioned Dword of a second vector (e.g., VB5), indicated as Dword_8, Dword_A, Dword_C, and Dword_E. Further, second vector even Dword PTU 404 outputs its selected even-positioned Dwords to the four most significant Dwords in the less significant vector (e.g., VB2) of the output dual vector (e.g., DV0). Given the preceding and resultant illustration of FIG. 4A, the even-positioned Dwords of two different vectors (e.g., VB4 and VB5) are selected and output to form interleaved Dwords as the least significant vector of the dual vector DV0=VB5: VB4, as shown by the sequence of Dword_0 at the least significant position in VB2, followed by Dword_2 at the next most significant position in VB2, and continuing up to Dword_E at the most significant position in VB2.

FIG. 4B illustrates two additional blocks of PTU 206_2, namely, a first vector odd Dword PTU 406 and a second vector odd Dword PTU 408, again both generally including switching or routing circuitry, coexisting with other EX phase 114 functional units and operating in response to the PSVTDV instruction, shown again in FIG. 4B in connection with two input vector operands VB4 and VB5. Similar to PTUs 402 and 404 which are connected to select and output even-positioned DWords, PTUs 406 and 408 are connected to but instead select and output odd-positioned Dwords, with the output of PTUs 406 and 408 providing the more significant half of Dwords of dual vector DV0=VB3:VB2, in response to the PSVTDV instruction. Particularly, first vector odd Dword PTU 406 selects, as shown be a first set of dashed lines that pass through it, every other odd-positioned Dword of the first vector (e.g., VB4), and at the same time, second vector odd Dword PTU 408 selects, as shown by a second set of dashed lines that pass through it, every other odd-positioned Dword of a second vector (e.g., VB5). Given the preceding and resultant illustration of FIG. 4B, the odd positioned Dwords of two different vectors (e.g., VB4 and VB5) are selected an output to form interleaved Dwords as the most significant half of the dual vector DV0=VB5:VB4, as shown by the sequence of Dword_1 at the least significant position in VB3, followed by Dword_3 at the next most significant position in VB3, and continuing up to Dword_F at the most significant position in VB3.

From the above, one skilled in the art should appreciate that example embodiments include a processing device with an instruction pipeline that includes a phase or phases responsive to particular vector transformation instructions. In an example embodiment, the pipeline includes structure that, for example in response to a fetched dual vector to paired single vectors (DVTPSV) instruction, decodes the instruction and executes to transform an interleaved dual vector operand and to responsively output a pair of single normal order vectors. In one approach, the structure outputs the pair of single normal order vectors, for example concurrently, in response to a single instruction. In an alternative embodiment, the structure may respond to two different instructions, for example at two different times, where a first of such instructions, when executed, transforms only a first portion (e.g., odd dual vector locations locations) into a respective single normal order vector, while a second of such instructions, when executed, transforms only a second portion (e.g., even dual vector locations locations) into a respective single normal order vector. This latter embodiment may be desirable where, for example, only the first or second portion is needed at a time for further processing. In addition, such structure may operate as a functional unit separate from other functional units, so that one or more of those other functional units may concurrently perform other respective functions, in which case the transformation does not add additional latency as it can be performed in parallel with other execution units (e.g., those doing arithmetic operations). In a same or different embodiment, the pipeline includes structure that, for example in response to a fetched paired single vectors to dual vector (PSVTDV) instruction, decodes the instruction and executes to transform two 512-bit vectors (e.g., natural order vectors) as operands and to responsively output a 1,204 bit (e.g., interleaved) dual vector. In one example, a first half (e.g., least significant half) of the dual vector is output at one time in response to a first instruction, and a second half (e.g., most significant half) of the dual vector is output at another time in response to a second instruction. This latter approach may be desirable, for example, to reduce total implantation hardware, and where only a portion (e.g., half) of the output dual vector is needed at a time. Vector sizes have been provided herein by way of example, but other sizes are contemplated. Further, while the above-described attributes are shown in combination, the inventive scope includes subsets of one or more features in other embodiments. Still further, also contemplated are changes in function partitions, and the like, with the preceding providing only some examples, with others ascertainable, from the teachings herein, by one skilled in the art. Accordingly, additional modifications are possible in the described embodiments, and other embodiments are possible, within the scope of the following claims.

The invention claimed is:

1. A device comprising:
- an arithmetic unit configured to:
  - receive vector data;
  - perform an arithmetic operation on the vector data; and
  - generate an output vector in response to the arithmetic operation; and
- a transformation unit configured to:
  - receive the vector data;
  - rearrange words from the vector data into a transformed vector at least partially in parallel with the arithmetic unit performing the arithmetic operation; and
  - output the transformed vector.

2. The device of claim 1, wherein to perform the arithmetic operation, the arithmetic unit is configured to perform a multiplication operation on the vector data.

3. The device of claim 1, wherein the transformation unit includes a plurality of multiplexers configured to receive the words from the vector data.

4. The device of claim 3, wherein the plurality of multiplexers are configured to output the transformed vector.

5. The device of claim 1,
- wherein the transformation unit includes a transformation input, a lower even half transformation unit, and a lower odd half transformation unit,
- wherein the lower even half transformation unit is associated with a set of least significant even-positioned Dwords in a first vector received at the transformation input, and
- wherein the lower odd half transformation unit is associated with a set of least significant odd-positioned Dwords in a second vector received at the transformation input.

6. The device of claim 1,
- wherein the transformation unit includes a transformation input, an upper even half transformation unit, and an upper odd half transformation unit,
- wherein the upper even half transformation unit is associated with a set of most significant even-positioned Dwords in a first vector received at the transformation input, and wherein the upper odd half transformation unit is associated with a set of most significant odd-positioned Dwords in a second vector received at the transformation input.

7. The device of claim 1, wherein the transformation unit includes multiplexers configured to select a Dword from the vector data and output the Dword to a location in the transformed vector.

8. The device of claim 7, wherein to receive the vector data, the transformation unit is configured to receive a dual vector, and wherein to output the transformed vector, the transformation unit is configured to output two single vectors.

9. The device of claim 1, further comprising a controller, wherein the arithmetic unit includes a first multiplication unit and a second multiplication unit, wherein to receive the vector data, the transformation unit is configured to receive a first set of vector operands and a second set of vector operands, wherein the first multiplication unit is configured to receive the first set of vector operands over a first set of multiplication inputs, wherein the second multiplication unit is configured to receive the second set of vector operands over a second set of multiplication inputs, wherein the controller is configured to control the first multiplication unit and the second multiplication unit to generate the output vector, and wherein the output vector includes an interleaved vector operand based on the first set of vector operands and the second set of vector operands.

10. The device of claim 1, further comprising a controller including one or more control registers, wherein the arithmetic unit is controlled by states in the one or more control registers in the controller.

11. The device of claim 1, wherein to receive the vector data, the transformation unit is configured to receive a first vector and a second vector, wherein to output the transformed vector, the transformation unit is configured to output a dual vector, wherein the transformation unit includes a first set of multiplexers configured to select even positioned Dwords from the first vector and output the even positioned Dwords from the first vector to least significant Dwords in a less significant vector of the dual vector, and wherein the transformation unit includes a second set of multiplexers configured to select even positioned Dwords from the second vector and output the even positioned Dwords from the second vector to most significant Dwords in the less significant vector of the dual vector.

12. The device of claim 11, wherein the transformation unit includes a third set of multiplexers configured to select odd positioned Dwords from the first vector and output the odd positioned Dwords from the first vector to the least significant Dwords in a more significant vector of the dual vector, and wherein the transformation unit includes a second set of multiplexers configured to select odd positioned Dwords from the second vector and output the odd positioned Dwords from the second vector to the most significant Dwords in the more significant vector of the dual vector.

13. The device of claim 1, further comprising an instruction pipeline including:

an instruction fetch phase;

an instruction dispatch and decode phase; and an instruction execution phase including the arithmetic unit and the transformation unit.

14. A method comprising:

receiving, at an arithmetic unit, vector data;

performing, by the arithmetic unit, an arithmetic operation on the vector data;

generating, by the arithmetic unit, an output vector in response to the arithmetic operation;

receiving, at a transformation unit, the vector data;

rearranging, by the transformation unit, words from the vector data into a transformed vector at least partially in parallel with the arithmetic unit performing the arithmetic operation; and outputting, by the transformation unit, the transformed vector.

15. The method of claim 14, wherein performing the arithmetic operation comprises performing a multiplication operation on the vector data.

16. The method of claim 14, wherein the vector data includes a dual vector, and wherein the transformed vector includes two single vectors.

17. The method of claim 14, wherein the vector data includes a first vector and a second vector, and wherein the transformed vector includes a dual vector.

18. A device comprising:

a controller;

an arithmetic circuit coupled to the controller and configured to:

receive vector data; and perform an arithmetic operation on the vector data; and a transformation circuit coupled to the controller and configured to:

receive the vector data; and rearrange words from the vector data at least partially in parallel with the arithmetic circuit performing the arithmetic operation on the vector data;

wherein the transformation circuit includes a lower even half transformation circuit and a lower odd half transformation circuit.

19. The device of claim 18, wherein the lower even half transformation circuit is associated with a set of least significant even-positioned bits in a first vector in the vector data, and wherein the lower odd half transformation circuit is associated with a set of least significant odd-positioned bits in a second vector in the vector data.

20. The device of claim 18, wherein the transformation circuit includes an upper even half transformation circuit and an upper odd half transformation circuit, wherein the upper even half transformation circuit is associated with a set of most significant even-positioned bits in a first vector in the vector data, and wherein the upper odd half transformation circuit is associated with a set of least significant odd-positioned bits in a second vector in the vector data.

* * * * *